UNITED STATES PATENT OFFICE.

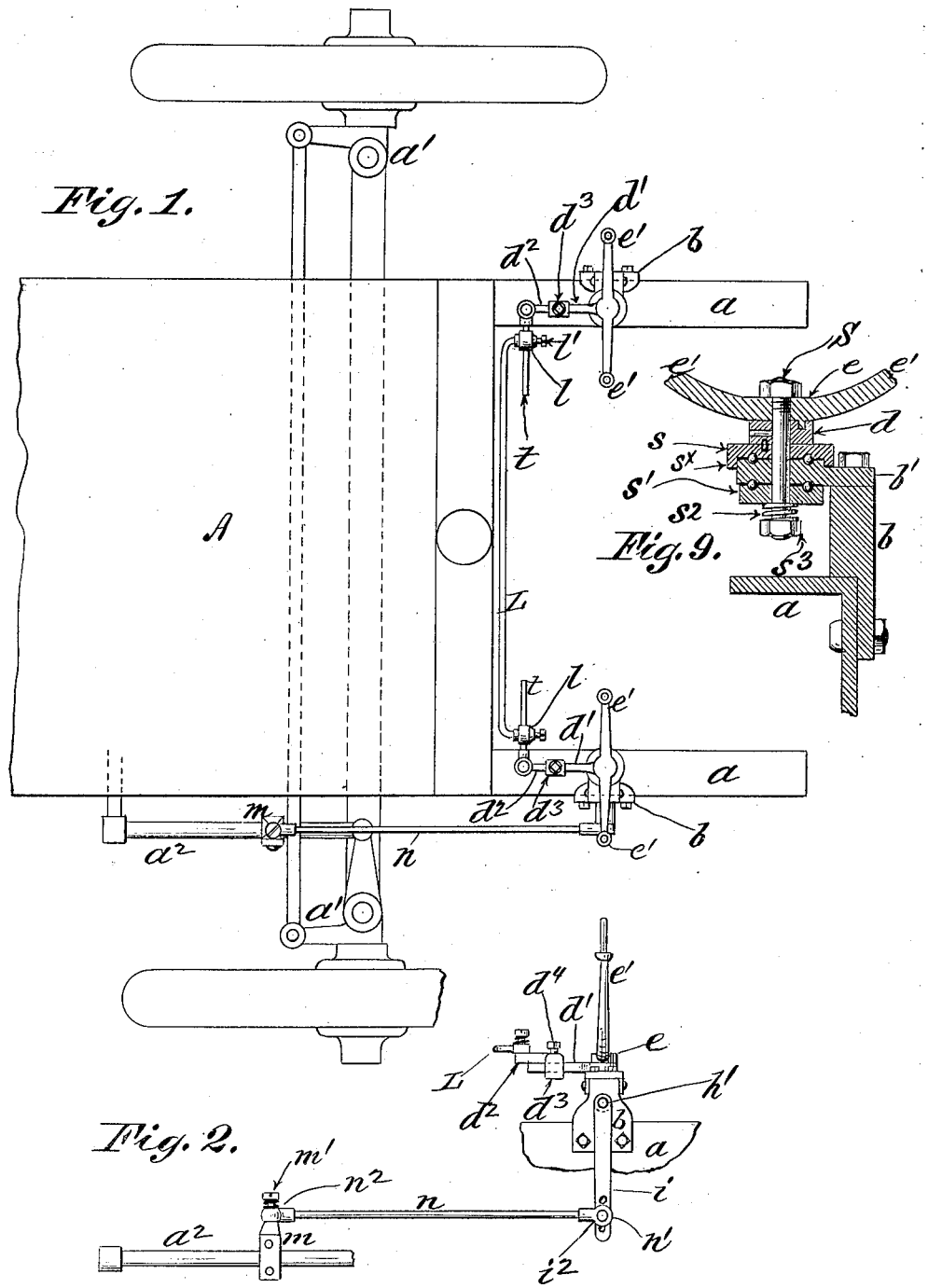

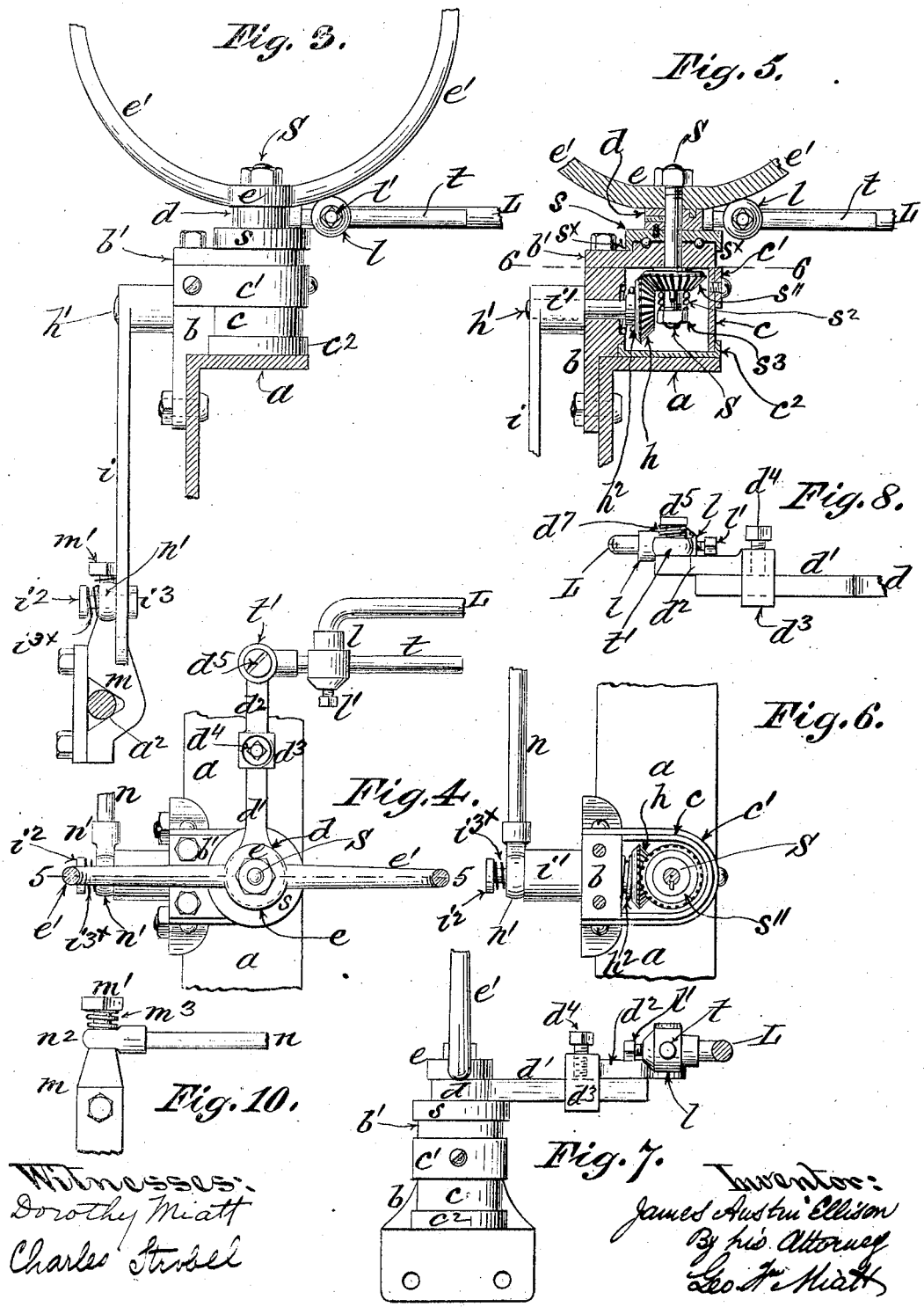

JAMES AUSTIN ELLISON, OF WILMINGTON, DELAWARE.

DIRIGIBLE HEADLIGHT FOR VEHICLES.

1,057,228.   Specification of Letters Patent.   Patented Mar. 25, 1913.

Application filed September 7, 1912. Serial No. 719,069.

*To all whom it may concern:*

Be it known that I, JAMES AUSTIN ELLISON, a citizen of the United States, residing at Wilmington, in the county of Newcastle and State of Delaware, have invented certain new and useful Improvements in Dirigible Headlights for Vehicles, of which the following is a specification.

My improvements relate to apparatus employed in conjunction with the steering gear of automobiles, &c., to effect the automatic turning of the search or head lights in unison and substantially in parallelism with the front wheels of the vehicle for the purpose of projecting the light in the line of travel, as set forth in my Patent No. 1,045,008, granted November 19, 1912.

Apparatus of the class designated is subjected to an exceptional degree of strain and vibration, and hence is liable to rapidly deteriorate and become inoperative, besides creating undue resistance which retards the speed and impairs the utility of the vehicle.

The object of my present invention is to overcome these difficulties, and to afford less complicated mechanism whereby the lamps may be connected in the simplest and most direct manner with the steering gear of the vehicle,—the construction at the same time being compact and durable as well as comparatively inexpensive.

The invention consists in the specific construction and arrangement of parts described and claimed, a distinguishing feature being the utilization of miter gearing in such manner that a single lever and connecting rod are the only parts interposed between the primary lamp turning mechanism and the steering gear of the vehicle, as hereinafter fully set forth.

In the accompanying drawings, Figure 1, is a diagrammatic plan illustrating the practical application of my improved dirigible lamp apparatus to an automobile car, which latter is represented in partial outline only; Fig. 2, is a side view of the operative parts of my dirigible lamp mechanism shown in Fig. 1; Fig. 3, is a front elevation, upon an enlarged scale, of the primary operative parts of my dirigible lamp mechanism shown on the right hand side of the car in Fig. 1; Fig. 4, is a top view of the parts shown in Fig. 3, the connecting rod to the steering gear being broken away, and the steering gear clamp being omitted; Fig. 5, is a vertical sectional elevation, taken upon plane of line 5—5 Fig. 4; Fig. 6, is a horizontal sectional elevation taken upon plane of line 6—6 Fig. 5; Fig. 7, is an elevation of the inner side of primary spindle bearing and connections, detached from the frame of the car; Fig. 8, is a detail view of one of the thrust arm extension members &c.; Fig. 9, a sectional elevation, similar to Fig. 5, of the left hand or secondary lamp spindle mount; Fig. 10, a detail view of the joint between the steering gear clamp and the transmitting rod.

In Fig. 1, A, represents the hood of an automobile, and $a$, $a$, stationary parts of the frame work of the machine, $a''$, $a'$, being the steering knuckles, and $a^2$, the member of the steering gear which actuates the same.

The drawings show the parts so arranged that the motion derived from the steering gear of the vehicle is transmitted to the lamp spindle on the right hand side of the car, although this is not a material feature, as either lamp spindle may be equipped as the primary turning spindle,—the other or secondary spindle being so coupled to such primary turning spindle as to turn in unison therewith, and being similarly constructed and mounted except that the miter gears and connections are omitted. With this exception in mind, the following description of the bearing mount applies to both lamp spindles, it being further understood that I do not confine myself to the identical construction of supporting parts shown, in which $b$, represents a standard bolted to a longitudinal member or stationary part $a$, of the frame or chassis. This standard $b$, carries a bearing bracket $b'$, rigidly bolted thereto or otherwise forming an integral part thereof. The top of the bearing bracket $b'$, is formed with an annular race way in which are seated anti-friction balls, and on these latter rests a spindle plate $s$,—also formed (on its under side) with an annular groove or race way for the series of anti-friction balls, as will be understood by reference particularly to Figs. 5 and 9 of the drawings. Resting on top of the spindle plate $s$, is the hub $d$, of a thrust arm $d'$, and on top of the hub $d$, of the thrust arm rests the hub $e$, of the lamp arms $e'$, $e'$, upon and between which a lamp is suspended in the usual manner. The spindle plate $s$, thrust arm hub $d$, and lamp support hub $e$, are formed with interlocking parts and are rigidly secured to the spindle bolt S, which latter with the spindle plate $s$, constitutes the axle of rotation. Each thrust arm $d'$, is provided with an extension member $d^2$, formed with a sleeve socket $d^3$, fitting over the thrust arm $d'$,—said sleeve $d^3$, being provided with a set screw $d^4$, whereby the extension member $d^2$, is adjustable secured to said thrust arm $d'$.

Pivotally mounted on the outer end of each extension member $d^2$, is a coupling tongue $t$. The connecting link L, is formed with end socket pieces $l$, $l$, for engagement with the coupling tongues $t$, said socket pieces $l$, $l$, being provided with set screws $l'$ $l'$, whereby the connecting link L, and the coupling tongues $t$, may be rigidly secured together,—the length of the tongues $t$, $t$, affording a suitable margin of adjustment in the application of my dirigible lamp mechanism to automobiles of different width. In this respect the means of connection between the lamp spindles is essentially the same as in my concurrent application hereinbefore referred to, the novelty in the present case consisting in the use of the sleeve extension $d^2$, $d^3$, and binding screw $d^4$, by which I attain a more simple and substantial adjustable extension of the thrust rod $d'$; and also in the use of a spring controlled joint between the extension member $d^2$, and the coupling tongue $t$. This spring controlled pivotal joint is shown more particularly in Fig. 8, by reference to which it will be seen that the pivot $d^5$, consists of a headed screw stud on the outer end of the extension member $d^2$, of the thrust arm $d'$, between the head of which stud $d^5$, and the eye $t'$, of the coupling tongue is interposed a spring $d^7$, which exerts an elastic resilient pressure on said coupling tongue,—said spring by yielding under the vibration to which the parts are subjected during the use of the car, preventing undue strain while tending constantly to maintain the proper contact and alinement of parts. This yieldable joint being duplicated at each end of the connecting link L, protects both lamp spindles against undue strain, and obviates the weakening of the metal by crystallization due to vibration, particularly in the intermediate connections between spindles. For a similar reason both lamp axles are held in position by elastic resilient tension applied to the lower end of each spindle bolt S, by a spring $s^2$, interposed between a nut or shoulder $s^3$, on the bolt S, and a collar splined to the spindle bolt S, and resting against the under side of the bearing bracket $b'$, as shown in Figs. 5 and 9. Thus in Fig. 9, the splined collar referred to consists of a disk $s'$, whereas in Fig. 5, the splined miter gear $s''$, answers the same purpose,—the tension of the spring $s^2$, in either case being exerted to hold the spindle plate $s$, down upon the ball bearings, while obviating dangerous rigidity and at the same time preventing looseness or rattling.

The splined miter gear $s''$, on the primary lamp spindle shown in Fig. 5, meshes with a corresponding miter gear $h$, on the inner end of rock shaft $h'$, which is journaled in the standard $b$, and has rigidly attached to its outer end the rock lever $i$. Interposed between the miter gear $h$, and the standard $b$, is a take up spring $h^2$, which tends constantly to thrust the shaft $h'$, inward with the rock lever sleeve socket $i'$, resting against the outer side of the standard $b$, and with the miter gear $h$, in close engagement with the spindle gear $s''$, as shown in Fig. 5. The spring $h^2$, however, yields sufficiently to obviate undue strain which might otherwise result during rough travel, and prevents looseness, while compensating for wear, &c. Since the motion of the rock lever $i$, is necessarily prescribed to less than a half circle it is obvious that segmental miter gears may be substituted for those shown in the drawings with like results, and without departing from the spirit and intent of my invention in this respect.

In order to isolate and protect the miter gearing, and afford adequate means of lubrication therefor, I inclose them in a tight casing adapted to hold a suitable fluid or semi-fluid lubricant. This casing may obviously be formed in various ways with like result. In the drawings I have shown it as formed of a shell $c$, bound to the standard $b$, by a strap $c'$, and closed at top by the under side of the bearing plate $b'$, and at bottom by a cap plate $c^2$, thus forming a sealed chamber for the lubricant.

The rock lever $i$, fulcrumed on the rock shaft $h'$, as above set forth, is connected with the member $a^2$, of the vehicle steering gear through the medium of the transmitting rod $n$, and the clamp $m$, which latter is secured adjustably upon said member $a^2$, of the vehicle steering gear, in such manner as to regulate with accuracy the vibratory swing of the rock lever $n$, with relation to the transmitting gears $h$, and $s''$, so as to attain the requisite parallelism between the lamps and the wheels of the vehicle.

The transmitting rod $n$, is pivotally connected with the rock lever $i$, by a horizontal coupling bolt $i^2$, passing loosely through one of a series of holes in the lower extremity of said rock lever $i$, and loosely through a horizontal eye piece $n'$, on the forward end of the connecting rod $n$,—a nut $i^3$, Fig. 3, acting as a shoulder to prevent the displacement of the coupling bolt $i^2$. A spring $i^{3x}$, is interposed between the head of the coupling bolt $i^2$, and the horizontal eye piece $n'$, and tends constantly to force the latter against the rock lever $i$, as shown in Figs. 3, 4 and 6.

The rear end of the transmitting rod $n$, is formed with a vertical eye piece $n^2$, through which extends a vertical stud screw $m'$, attached to the upper end of the clamp $m$, (see particularly Fig. 10). A spring $m^3$, is interposed between the head of the stud screw $m'$, and the upper end of the clamp $m$, and tends constantly to press the eye piece $n^2$, down against said upper end of the clamp $m$. Thus the transmitting rod $n$, is connected by a vertical pivot to the steering gear clamp $m$, and by a horizontal pivot to the rock lever $i$,—both joints being loose and controlled by elastic resilient tension springs, so that said transmitting rod is free to adapt itself to all the requirements of use without binding or strain in either of the connected parts. Furthermore the springs by taking up the slack prevent undue wear and noise. The spindle plate $s$, is formed with a peripheral lip flange $s^x$, which protects the anti-friction race way against the intrusion of dust, dirt, &c.

The operation of my improved lamp swivel mechanism will be readily understood. The transmitting rod $n$, rocks the lever $i$, which causes the gear $h$, to turn the splined gear $s''$, thereby turning the primary spindle on its ball bearing, and this motion is transmitted to the left hand or secondary lamp spindle, through the medium of the thrust arms $d''$, coupling tongues $t$, and coupling link L.

The adjustment of the extension members $d^2$, on the thrust arms $d''$, and of the coupling link L, on the coupling tongues $t$, admits of the accurate alinement of the twin lamps with relation to each other; and in this connection the extension members $d^2$, formed with the socket sleeves $d^3$, are a new and important feature in that they afford simple but cheap and effective means for controlling the rearward extension of coupling tongues $t$, and coupling link L, so that the latter may be positioned close to the front of the hood of the car. By the use of the elastic resilient spring tension joints I also safe guard the apparatus against undue tortuous strain, and counteract the effects of the vibration to which the parts are necessarily subjected during use upon an automobile. Hence rattling, noise and excessive wear are eliminated, and the "resistance", or power requisite for operating the lamps, is reduced to the minimum. Another advantage is that the arrangement of parts is compact, direct and close to the frame of the machine, so that there are no objectionable protrusions.

What I claim as my invention and desire to secure by Letters Patent is,

1. In lamp swivel mechanism of the character designated, actuated by motion derived from the steering gear of the vehicle, the combination of a steering gear clamp, a rock lever, a transmitting rod interposed between said steering gear clamp and said rock lever and formed with end eye members occupying planes at right angles to each other, stud bolts on the steering gear clamp and in the rock lever engaging said eye members on the ends of the transmitting rod, springs on said stud bolts bearing against said eye members of the transmitting rod, a rock shaft to which said rock lever is attached, a miter gear on said rock shaft, a lamp spindle and a miter gear thereon engaging with that on said rock shaft, for the purpose described.

2. In lamp swivel mechanism of the character designated, actuated by motion derived from the steering gear of the vehicle, the combination of a steering gear clamp formed with a vertical stud bolt, a transmitting rod formed with a rear end eye member engaging said vertical stud bolt, a spring on said vertical stud bolt bearing against said rear eye member of the transmitting rod, a rock lever provided with a horizontal stud bolt, a front end eye member on said transmitting rod engaging said horizontal stud bolt on the rock lever, a spring on said horizontal stud bolt bearing against said front end eye member on the transmitting rod, a rock shaft to which said rock lever is attached, a miter gear on said rock shaft, a lamp spindle, and a miter gear thereon engaging with that on the rock shaft, for the purpose described.

3. In lamp swivel mechanism of the character designated, actuated by motion derived from the steering gear of the vehicle, the combination of a steering gear clamp, a rock lever, transmitting means interposed between said clamp and lever and having members disposed in planes at substantially right angles to each other, springs bearing against said members, a rock shaft to which said rock lever is attached, and a lamp spindle revoluble from said rock shaft.

4. In lamp swivel mechanism of the character designated, actuated by motion derived from the steering gear of the vehicle, the combination of a steering gear clamp, a rock lever, transmitting means interposed between said clamp and lever and having members disposed in planes at substantially right angles to each other, springs bearing against said members, a rock shaft to which said rock lever is attached, a lamp spindle revoluble from said rock shaft, a spindle plate, an annular ball bearing for the lamp spindle, and a spring tending to hold the spindle plate down upon said ball bearing.

5. In lamp swivel mechanism of the character designated, actuated by motion derived from the steering gear of the vehicle, the combination of a steering gear clamp, a rock lever, a transmitting rod interposed between and pivotally connected with said steering gear clamp and said rock lever and having members disposed at substantially right angles to each other, a spring bearing against said members, a rock shaft to which said rock lever is attached, a miter gear on said rock lever, a lamp spindle, a miter gear thereon engaging with that on the rock shaft, an annular ball bearing on which the lamp spindle is supported, and a tension spring arranged to press said lamp spindle against said annular ball bearing, for the purpose described.

6. In lamp swivel mechanism of the character designated, actuated by motion derived from the steering gear of the vehicle, the combination of a steering gear clamp, a rock lever, a transmitting rod interposed between and pivotally connected with said steering gear clamp and said rock lever and having members disposed at substantially right angles to each other, a spring bearing against said members, a rock shaft to which said rock lever is attached, a miter gear on said rock shaft, a tension spring on said rock shaft interposed between the rock shaft bearing and said miter gear, a lamp spindle and a miter gear thereon engaging with that on the rock shaft, for the purpose described.

7. In lamp swivel mechanism of the character designated, actuated by motion derived from the steering gear of the vehicle, the combination with each of two lamp spindles of a thrust arm mounted thereon, an extension member on each of said thrust arms formed with a socket sleeve embracing the thrust arm, and with a set screw for locking the extension member in position on said thrust arm, coupling tongues, one pivotally attached to each of said extension members, a connecting link formed with end socket pieces engaging said coupling tongues and set screws on said end socket pieces for securing the connecting link adjustably upon said coupling tongues, for the purpose set forth.

8. In lamp swivel mechanism of the character designated, actuated by motion derived from the steering gear of the vehicle, the combination with each of twin lamp spindles of a thrust arm mounted thereon, a stud bolt on the outer end of each thrust arm, coupling tongues, one pivotally attached to each of said stud bolts, springs on said stud bolts pressing the coupling tongues against said thrust arms, a connecting link formed with end socket pieces engaging said coupling tongues and set screws on said end socket pieces for securing the connecting link to said coupling pins.

9. In lamp swivel mechanism of the character designated, actuated by motion derived from the steering gear of the vehicle, the combination of a steering gear clamp, a rock lever, a transmitting rod interposed between and pivotally connected with said steering gear clamp and said rock lever and having members disposed at substantially right angles to each other, a spring bearing against said members, a rock shaft to which said rock lever is attached, a miter gear on said rock shaft, a lamp spindle, a miter gear thereon engaging with that on the rock shaft, a second lamp spindle, and means connecting the two said spindles in such manner that they move in unison, for the purpose described.

10. In lamp swivel mechanism of the character designated, actuated by motion derived from the steering gear of the vehicle, the combination of a steering gear clamp, a rock lever, a transmitting rod interposed between and pivotally connected with said steering gear clamp and said rock lever, a rock shaft to which said rock lever is attached, a miter gear on said rock shaft, a lamp spindle, a miter gear thereon engaging with that on the rock shaft, an annular ball bearing supporting said lamp spindle, a tension spring arranged to press said lamp spindle against said annular ball bearing, a second lamp spindle, an annular ball bearing supporting said last-named lamp spindle, a tension spring arranged to press said last-named lamp spindle against its annular ball bearing, and means connecting the two spindles in such manner that they move in unison, as and for the purpose described.

JAMES AUSTIN ELLISON.

Witnesses:
Thomas S. Lewis,
Geo. Wm. Meatt.

---

Copies of this patent may be obtained for five cents each, by addressing the "Commissioner of Patents, Washington. D. C."